United States Patent
Roberge et al.

(10) Patent No.: US 10,058,840 B2
(45) Date of Patent: Aug. 28, 2018

(54) METHOD FOR PREVENTING PLUGGING OF A CONTINUOUS-REACTION CHANNEL-SYSTEM AND MICRO-REACTOR FOR CARRYING OUT THE METHOD

(75) Inventors: Dominique Roberge, Sierre (CH); Fabio Rainone, Morges (CH); Wilhelm Quittmann, Visp (CH); Michael Gottsponer, Visperterminen (CH); Markus Eyholzer, Brig-Glis (CH)

(73) Assignee: LONZA LTD., Visp (CH)

( * ) Notice: Subject to any disclaimer, the term of this patent is extended or adjusted under 35 U.S.C. 154(b) by 1838 days.

(21) Appl. No.: 14/387,758

(22) PCT Filed: Aug. 26, 2010

(86) PCT No.: PCT/EP2010/062476
§ 371 (c)(1),
(2), (4) Date: Jan. 22, 2015

(87) PCT Pub. No.: WO2011/023761
PCT Pub. Date: Mar. 3, 2011

(65) Prior Publication Data
US 2015/0158007 A1    Jun. 11, 2015

(30) Foreign Application Priority Data

Aug. 28, 2009  (WO) ................. PCT/EP2009/061143
Sep. 14, 2009  (EP) ..................................... 09011726
Mar. 23, 2010  (EP) ..................................... 10157285

(51) Int. Cl.
*B01J 19/00* (2006.01)
*B01F 5/06* (2006.01)
(Continued)

(52) U.S. Cl.
CPC .......... *B01J 19/0093* (2013.01); *B01F 5/0646* (2013.01); *B01F 13/0059* (2013.01);
(Continued)

(58) Field of Classification Search
CPC .......... B01J 19/0093; B01J 2219/00783; B01J 2219/00889; B01J 2219/00891;
(Continued)

(56) References Cited

U.S. PATENT DOCUMENTS 5,830,127 A * 11/1998 DeCastro ............... A61B 1/122
                                                        600/153
7,942,568 B1 * 5/2011 Branch ............... B01F 11/0266
                                                        366/127
(Continued)

FOREIGN PATENT DOCUMENTS

EP         1839739      10/2007
JP         4734027      10/1972
(Continued)

OTHER PUBLICATIONS

English translation of Japanese Office Action cited in corresponding Japanese patent application.
(Continued)

*Primary Examiner* — Anshu Bhatia
(74) *Attorney, Agent, or Firm* — Hoffmann & Baron, LLP

(57) ABSTRACT

A method for preventing plugging of a continuous-reaction channel-system caused by a by-product of a continuous-reaction being carried out in said channel-system comprises the step of generating at least one ultrasonic wave travelling through said channel-system by coupling in a flow direction of at least one process fluid of a plurality of process fluids said at least one ultrasonic wave into said at least one process fluid.

7 Claims, 2 Drawing Sheets

(51) Int. Cl.
  *B01F 13/00* (2006.01)
  *B01F 15/00* (2006.01)
  *B08B 9/032* (2006.01)
  *B08B 17/02* (2006.01)

(52) U.S. Cl.
  CPC ........ *B01F 15/00019* (2013.01); *B08B 9/032* (2013.01); *B08B 17/02* (2013.01); *B01J 2219/00783* (2013.01); *B01J 2219/00889* (2013.01); *B01J 2219/00891* (2013.01); *B01J 2219/00932* (2013.01); *B08B 2209/005* (2013.01)

(58) Field of Classification Search
  CPC .......... B01J 2219/00932; B01F 5/0646; B01F 15/00019; B01F 13/0059; B08B 9/032; B08B 17/02; B08B 2209/005
  See application file for complete search history.

(56) References Cited

U.S. PATENT DOCUMENTS

| | | |
|---|---|---|
| 2004/0241865 A1 | 12/2004 | Gabski et al. |
| 2005/0016851 A1 | 1/2005 | Jensen et al. |
| 2008/0194816 A1* | 8/2008 | Yoshida ................ C07F 7/2212 544/124 |
| 2009/0269250 A1* | 10/2009 | Panagiotou ........... B01F 5/0256 422/129 |

FOREIGN PATENT DOCUMENTS

| | | |
|---|---|---|
| JP | 2004337649 | 12/2004 |
| JP | 2005060281 | 3/2005 |
| JP | 2007252979 | 10/2007 |
| JP | 2009509725 | 3/2009 |
| WO | WO03020414 | 3/2003 |
| WO | WO2004076053 | 9/2004 |
| WO | WO2004076056 | 9/2004 |
| WO | WO2007038976 | 4/2007 |
| WO | WO2009061416 | 5/2009 |

OTHER PUBLICATIONS

English translation of Chinese Office Action cited in corresponding Chinese patent application.

* cited by examiner

METHOD FOR PREVENTING PLUGGING OF A CONTINUOUS-REACTION CHANNEL-SYSTEM AND MICRO-REACTOR FOR CARRYING OUT THE METHOD

This application claims priority based on an International Application filed under the Patent Cooperation Treaty, PCT/EP2010/062476, filed on Aug. 26, 2010, which claims priority to PCT/EP2009/061143, filed Aug. 28, 2009, EP09011726.8, filed Sep. 14, 2009 and EP10157285.7, filed Mar. 23, 2010.

BACKGROUND OF THE INVENTION

The present invention refers to a method for preventing plugging of a continuous-reaction channel-system caused by a by-product of a continuous reaction being carried out in said channel-system, and a micro-reactor supporting the continuous-reaction channel-system for carrying out the method.

In micro-reactor continuous-reaction technology, a micro-reactor is continuously passed through by various chemical substances including a plurality of reactants (educts) flowing into the micro-reactor and reacting therein to form a product flowing out of the micro-reactor. Such a micro-reactor is disclosed, for example, in EP1 839 739 A1 of the same applicant. In some of these chemical reactions like metalation reactions where a hydrogen-metal or a halogen-metal exchange takes place, water present within the channel-system may react with one or more of the chemical substances, resulting in a precipitate plugging the channels. The local probability of such plugging to occur is not equal throughout the micro-reactor, but is highest at what are called hereafter plugging-susceptible areas which are confluence and mixing areas where the various reactants come together, are mixed and react with each other.

It should be noted that because even a moderate plugging results in an increased pressure compared to using dry feeds, and consequently in a possible decrease in yield, only dry feeds/solvents are used, which is very cost-intensive because the drying procedures applied are very involved. For example, several ethers such as diethyl ether, methyl tertiary butyl ether (MTBE), tetrahydrofuran (THF) or solvents such as dimethyl sulfoxide (DMSO) are very hard—and therefore expensive—to completely separate from traces of water. In addition, drying is not in all cases without any problems. For example, the above reaction (1) is known to proceed very violently, and other substances like organic nitrates or azides may even be explosive. The reference to organic nitrates or azides is only to give a general example that some substances can not be dried because the drying procedure is dangerous. Therefore, also from this perspective, a method is needed that goes without drying.

SUMMARY OF THE INVENTION

It is an object of the present invention, therefore, to provide a method for preventing plugging of a continuous-reaction channel-system that is inexpensive compared to available methods, applicable when non-dry feeds/solvents are used, without any danger, and economic. It is a further object of the present invention to provide a micro-reactor for carrying out the method.

These objects are achieved by the features of the present invention. Advantageous aspects are defined in the dependent claims.

According to the present invention (claim 1), a method for preventing plugging of a continuous-reaction channel-system caused by a by-product of a continuous-reaction being carried out in the channel-system comprises the step of generating at least one ultrasonic wave travelling through the channel-system by coupling in a flow direction of at least one process fluid of a plurality of process fluids the at least one ultrasonic wave into the at least one process fluid such, where "preventing plugging" according to the present invention includes "avoiding its coming into existence" as well as "removing plugging having already occured". Therefore, the at least one ultrasonic wave is guided by and along the channel-system or part of the channel-system to plugging-susceptible areas thereof like an electromagnetic wave is guided in an optical fiber, the at least one process fluid serving as a carrier medium for the at least one ultrasonic wave. Preferably, the at least one ultrasonic wave is generated as close as possible to the plugging-susceptible areas, in order to reduce attenuation effects. Most preferably, the at least one ultrasonic wave is generated outside but in close proximity of the micro-reactor. There is no restriction as for the detailed construction of an ultrasonic probe or device for generating the at least one ultrasonic wave as long as it can be applied to transfer the at least one ultrasonic wave to one or more of the process fluids to be transported thereby to the plugging-susceptible regions. Usually, piezo-electric transducers are used for this purpose, that are adapted in design and power to their field of application. Just as one of numerous examples, there is disclosed in document US 2009169428 as a medical application a flow cell with a piezo-electric transducer, where ultrasonic energy is applied to a continous flow of a suspension.

In document EP 1 570 918 A2, there is disclosed the transmission of ultrasonic energy into pressurized fluids. In document U.S. Pat. No. 5,830,127, there is disclosed a method for cleaning the interior channel of an elongated tubular instrument, like an endoscope, comprising the generation of ultrasonic waves in a liquid medium from within the interior channel. In document DE 10 2005 025 248 A1 there is disclosed a fluid guiding system in which, in order to prevent deposits in micro-channels of the system, an ultrasonic signal is coupled into the flowing fluid. It should be noted, however, that according to the present invention, plugging is prevented during normal operation of the micro-reactor—as is evident from the phrases "being carried out in said channel-system" and "in a flow direction of at least one process fluid" used in claim 1, and one process fluid or several process fluids is (are) used to transport the at least one ultrasonic wave into the micor-reactor for that purpose. Experiments have shown that for some reactions, the limit of tolerable water content, when the at least one ultrasonic wave is applied, can be extended up to about 500 ppm. From the above, it follows that the at least one ultrasonic wave may be travelling either essentially in or essentially against the flow direction of one or more of the process fluids, where the latter direction may be advantageous in case the location of plugging is nearest to the end of the micro-reactor in a flow direction of the process fluids.

Therefore, the ultrasonic wave energy is not primarily transported to the plug-susceptible areas via the outer shell of the micro-reactor, for example, although—as a matter of course—the outer shell and its vibration-relevant physical properties can not be completely neglected in this respect. The material of the micro-reactor, for instance, determines the attenuation, and part of the ultrasonic wave energy may be transported from the coupling area via the outer shell to the plug-susceptible areas. This is, however, to be regarded as a side-effect. As a rough orientation, the frequency of the at least one ultrasonic wave is preferably in the range of 16 kHz to 50 kHz or more, but should be adapted to the design and dimensions of the micro-reactor, the flow rates and the viscosities of the process fluids, and the chemical reactions taking place, etc. Advantageously, the frequency and/or power is not held at a constant value but is swept, in order to reduce the risk of standing wave formation characterized by nodal points where, due to the absence of ultrasonic energy deposition, precipitates may agglomerate and plug the flowpath/channel. The frequency may, furthermore, be modulated by a higher frequency which in turn may be swept.

To couple the at least one ultrasonic wave into the micro-reactor in the above described way, the inventors used a custom manufactured Branson 400 W ultrasound system with a sonotrode of 5 mm length, adjusting the frequency to about 40 kHz. Of course, any other ultrasound apparatus can equally be employed, as long as it is suited for transmitting the at least one ultrasonic wave to an on-going fluid, here the process fluids—including the reactants—flowing into the micro-reactor, or the process fluids—including one or more products generated within the micro-reactor and possibly, owing to circumstances, also one or more of the reactants—flowing out of the micro-reactor.

According to a preferred aspect of the present invention (claim 2), the plurality of process fluids comprises at least one feed flow, at least one product flow, and/or at least one solvent flow. That is, in the method according to the present invention, the at least one ultrasonic wave may be coupled into any type of process fluid and into either only one or a several process fluids of equal or the same type. It should be noted that the feature "in a flow direction" defined in claim 1 is not in contradiction to the feature that the at least one ultrasonic wave is coupled into a product flow because the product flow may for chemical or other reasons have a certain path within the channel-system.

According to a preferred aspect of the present invention (claim 3), chemical substances participating in the continuous-reaction comprise a plurality of reactants continuously flowing into the channel-system, and a product formed in the continuous-reaction by mixing and interconverting the plurality of reactants and continuously flowing out of the channel-system, wherein at least one of the plurality of reactants includes a compound comprising an alkali metal and an organic moiety reacting with water impurities in at least one of the feeds to form the by-product.

According to a preferred aspect of the present invention (claim 4), the alkali metal is selected from lithium, sodium or potassium.

Generally, the cause for plugging is solidifying NaOH, LiOH, KOH or RbOH which is formed in side reactions of the compounds comprising an alkaline metal and an organic moiety with the water impurities. Examples for those compounds are methyllithium, ethyllithium, propyllithium, iso-propyllithium, butyllithium, isobutyllithium, sec-butyl-lithium, tert-butyllithium, pentyllithium, isopentyllithium, sec-pentyllithium, tert-pentyllithium, sec-isopentyllithium, hexyllithium, isohexyllithium, sec-hexyllithium, cyclohex-yllithium, octyllithium, phenyllithium, o-tolyllithium, m-tolyllithium, p-tolyllithium, trimethylsilylmethyllithium, phenylsodium, o-tolylsodium, m-tolylsodium, p-tolylso-dium, butyllithiumpotassium-tert-butoxide, butyllithium/so-dium-tert-butoxide, etc., preferably isopropyllithium, sec-butyllithium, tert-butyllithium, sec-pentyllithium, tert-pentyllithium, sec-isopentyllithium, sec-hexyllithium, cyclohexyllithium, octyllithium and phenyllithium, more preferably butyllithium (n-, sec- or tert-) or hexyllithium.

In case the metal in the metalation reaction is lithium, as an example, this reaction is called a lithiation reaction, for example the reaction of n-BuLi (butyllithium) with water, where according to the following equation LiOH precipitates as solid:

$$C_4H_9Li + H_2O \rightarrow C_4H_{10} + LiOH \tag{1}$$

As stated above, LiOH tends to be formed in the neighbourhood of the entrance of the micro-reactor. Generally, for plugging to occur, only traces of water impurities are sufficient. Although an exact limit of tolerable water content within the channel-system can not be specified generally, because it depends on a number of parameters like the (type of) reactants, solvent, their flow-rates, and the chemical environment (pressure, temperature), a value of 10 ppm may be a realistic benchmark. Here, "tolerable" means that the reactor under such conditions is not subject to "severe" plugging.

According to an aspect of the present invention (claim 5), the at least one ultrasonic wave is coupled into the channel-system continuously, discontinuously or "on demand". In the first case, the required energy of the at least one ultrasonic wave may be very low, because plugging is continuously stopped in the bud, and no control is needed that may otherwise be used to signal imminent plugging and counteract appropriately. The energy of the at least one ultrasonic wave continuously coupled into the channel-system may be regularly or non-regularly varying or non-varying with time. In the second case, the at least one ultrasonic wave is coupled into the channel-system according to a predetermined or fixed coupling-pattern, whereas in the third case, the coupling-pattern is not fixed but adapted to a current situation. The coupling-pattern may, for example, be determined by a characteristic pressure of one of the at least one process fluid, said characteristic pressure may then serve as a control variable (claim 6), and comparing the characteristic pressure with a target pressure range. The at least one ultrasonic wave is then, for example, coupled into the channel-system only in case the characteristic pressure is outside the predetermined target pressure range. The predetermined target pressure has experimentally be determined to range between 0 and 10 bar above normal pressure in each of the feed lines, preferably in the range between 0 and 10 bar above normal pressure, and most preferably in the range between 0 and 3 bar, where normal pressure is the pressure of the system when in a water sensitive reaction only dry feeds (fed process fluids) are used. Normal pressure depends on the feed flow rate, the dimensions (diameters) and viscosities of the feeds etc. The coupling-pattern may also be specified by some rectangular function defining coupling times versus non-coupling times. The timing in this case may be, for example, correlated to the pulsation of a pump delivering the feeds or to the chemical reactions taking place. Alternatively, a continuous generation of the at least one ultrasonic wave can be combined with a detection of the pressure in order to adapt the intensitiy of the continuous at least one ultrasonic wave application to the plugging situation within the micro-reactor. To summarize, the power of the at least one ultrasonic wave that is coupled into the channel-system may be any function of time, either pre-determined or situation-adapted.

According to the present invention, a micro-reactor for carrying out the method comprises at least one feeding channel being provided each for one of the at least one process fluid and connected with each other at at least one confluence area, a mixing section adjacent to said confluence area, a retention section adjacent to said mixing section, a discharge channel, and at least one coupling means to directly couple the at least one ultrasonic wave in a flow direction into the at least one process fluid. The micro-reactor may be, for example, a micro-reactor as disclosed in EP 1 839 739 A1 or any other micro-reactor having a similar channel-structure and preferably serving a similar purpose.

BRIEF DESCRIPTION OF THE DRAWINGS

The above and further objects, features and advantages of the present invention become apparent by the following detailed description of a preferred embodiment with reference to drawing. In the drawing, there is.

DETAILED DESCRIPTION OF THE INVENTION

Figure 1:
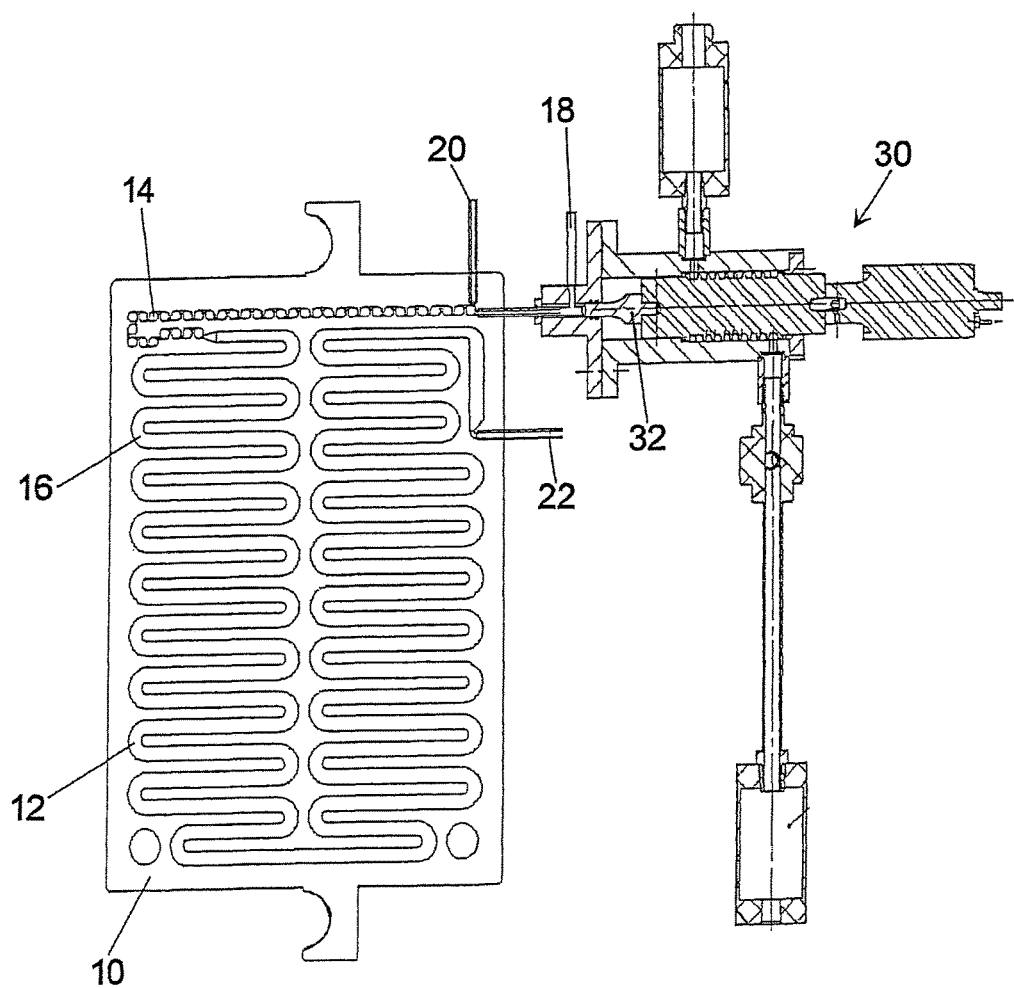
FIG. 1 a schematic cross-section of a plate of a micro-reactor coupled to an ultrasonic wave generator according to a preferred embodiment of the present invention for carrying out the method as defined in claims 1 through 7.

FIG. 1 schematically shows a cross-section of a plate 10 of a micro-reactor as described in more detail in EP 1 839 739 A1, for example, coupled to an ultrasonic wave generator 30. The plate 10 includes a meandering channel system 12 that is divided into a mixing zone 14 and a retention zone 16. Plate 10 comprises first and second feeds 18 and 20, respectively, for continuously introducing feed flows of process fluids including chemical substances participating in a continous-reaction taking place in the micro-reactor, and an outlet 22 where a reaction product included in a process fluid then called reaction fluid is discharged. The ultrasonic wave generator 30 includes a sonotrode 32 that comes into contact with the process fluid flowing into the micro-reactor via the first feed 18, and transfers ultrasonic energy, generated by a to-and-fro movement of the sonotrode 32, to the fed process fluid or simply feed flow. As clearly shown in FIG. 1, ultrasonic energy is coupled-in externally of the micro-reactor at an entrance side of the feed flow. Depending on the exact structure of the channel system 16, the location of contact of the sonotrode 32 and the feed flow can, however, also be located within the micro-reactor. Furthermore, although the ultrasonic wave generator 30 shown in FIG. 1 is a Branson™-generator, any other ultrasonic wave generator may be employed as long as it is adapted to transfer ultrasonic energy to one or more of the feed flows entering the micro-reactor. As stated above, the ultrasonic wave is guided through the channel system 12 using the feed flow as a medium.

Figure 2:
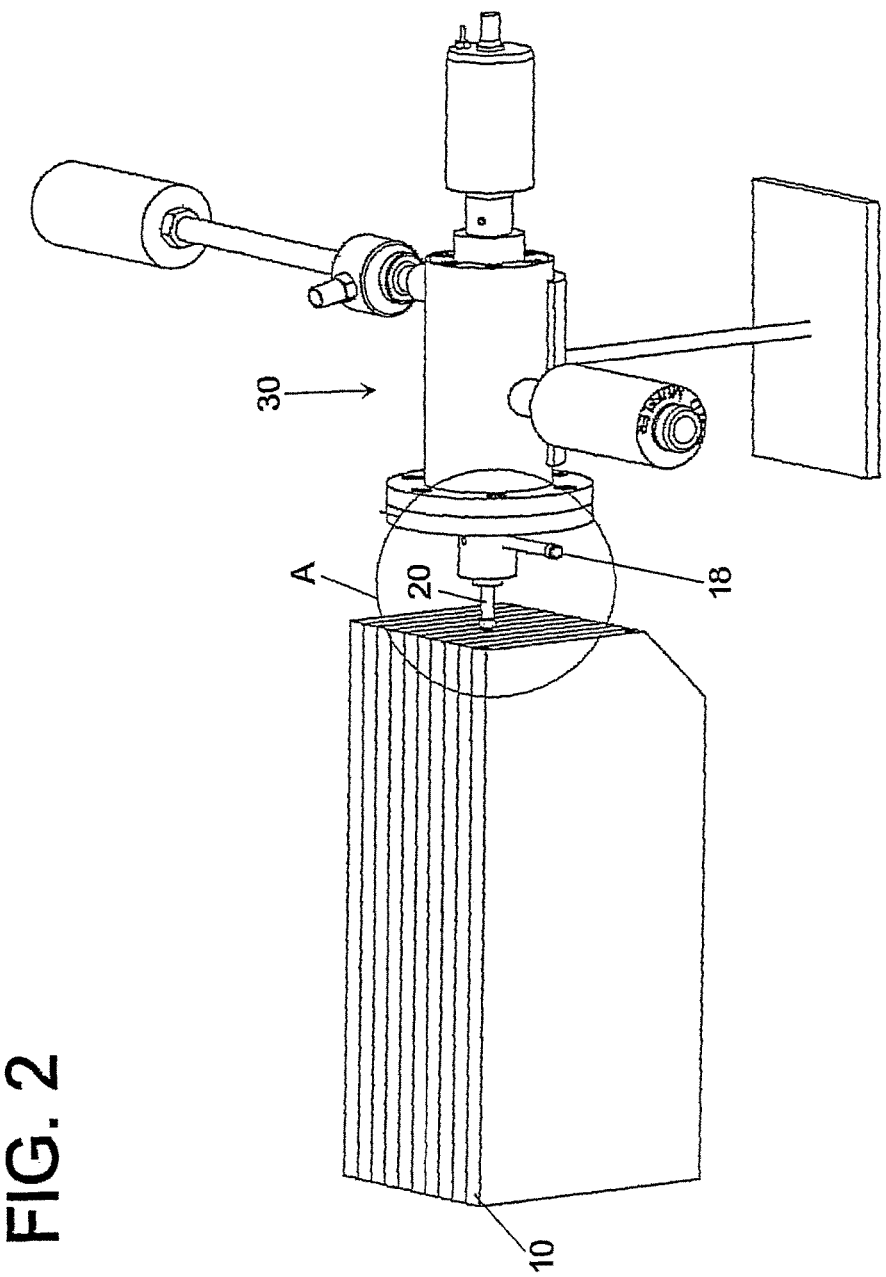
FIG. 2 a schematic perspective view of the arrangement of FIG. 1.

FIG. 2 shows a stack of plates 10 building-up the micro-reactor coupled to the ultrasonic wave generator 30. A circle "A" specifies an inlet region where the chemical substances continuously flow into the channel system 12 via the first and second feeds 18, 20 to be mixed and chemically interconverted therein.

REFERENCE NUMERALS 10 micro-reactor plate
12 channel system
14 mixing zone
16 retention zone
18 first feed
20 second feed
22 outlet
30 ultrasonic wave generator
32 sonotrode

The invention claimed is:

1. A method for preventing plugging of a continuous-reaction channel-system caused by a by-product of a continuous-reaction being carried out in said channel-system, said method comprising:
    coupling an ultrasonic wave source to a feeding duct of the channel system;
    feeding at least one process fluid of a plurality of process fluids into said feeding duct;
    generating at least one ultrasonic wave with said ultrasonic wave source; and
    guiding said at least one ultrasonic wave into said at least one process fluid travelling through said channel-system in a flow direction of said at least one process fluid, said at least one process fluid serving as a carrier medium for the at least one ultrasonic wave to thereby continuously prevent the formation of solid precipitates in said at least one process fluid.

2. A method according to claim 1, wherein said plurality of process fluids comprises at least one feed flow, at least one product flow, and/or at least one solvent flow.

3. A method according to claim 1, wherein chemical substances participating in said continuous-reaction comprise a plurality of reactants continuously flowing into said channel-system, and a product formed in said continuous-reaction by mixing and interconverting said plurality of reactants and continuously flowing out of said channel-system, wherein at least one of said plurality of reactants includes a compound comprising an alkali metal and an organic moiety reacting with water impurities in at least one feed to form said by-product.

4. A method according to claim 3, wherein said alkali metal is selected from lithium, sodium or potassium.

5. A method according to claim 1, wherein said at least one ultrasonic wave is coupled into said channel-system continuously, discontinuously or on demand.

6. A method according to claim 5, wherein, in case said at least one ultrasonic wave is coupled into said channel-system on demand, a characteristic pressure of said at least one process fluid is used as a control variable.

7. A method according to claim 1, wherein said channel-system is part of a continuous-reaction micro-reactor.

* * * * *